US009577539B2

(12) United States Patent
Sakita

(10) Patent No.: US 9,577,539 B2
(45) Date of Patent: Feb. 21, 2017

(54) POWER SUPPLY DEVICE AND POWER SUPPLY SYSTEM THAT HAVE A SERIAL CONNECTION TERMINAL, A REVERSE FLOW PREVENTION RECTIFYING DEVICE AND A BYPASS RECTIFYING DEVICE

(71) Applicant: TDK Corporation, Minato-ku, Tokyo (JP)

(72) Inventor: Kouichi Sakita, Minato (JP)

(73) Assignee: TDK CORPORATION (JP)

( * ) Notice: Subject to any disclaimer, the term of this patent is extended or adjusted under 35 U.S.C. 154(b) by 209 days.

(21) Appl. No.: 14/167,123

(22) Filed: Jan. 29, 2014

(65) Prior Publication Data

US 2014/0211513 A1 Jul. 31, 2014

(30) Foreign Application Priority Data

Jan. 30, 2013 (JP) ................................. 2013-015284
Jan. 30, 2013 (JP) ................................. 2013-015289

(51) Int. Cl.
*H02M 3/158* (2006.01)
*H02M 7/162* (2006.01)
(Continued)

(52) U.S. Cl.
CPC ....... *H02M 3/33523* (2013.01); *H02M 3/1584* (2013.01); *H02M 7/1626* (2013.01);
(Continued)

(58) Field of Classification Search
CPC .. H02M 7/155; H02M 7/1555; H02M 7/1557; H02M 7/162; H02M 7/1623; H02M 7/1626; H02M 7/19; H02M 7/217; H02M 7/219
See application file for complete search history.

(56) References Cited

U.S. PATENT DOCUMENTS 4,559,590 A * 12/1985 Davidson .......... H02M 3/33569
363/133
5,278,748 A * 1/1994 Kitajima ................. H02M 1/34
363/21.02
(Continued)

FOREIGN PATENT DOCUMENTS

JP    S63-245260 A    10/1988
JP    H01-082682 U    6/1989
(Continued)

*Primary Examiner* — Jeffrey Gblende
(74) *Attorney, Agent, or Firm* — Harness, Dickey & Pierce, P.L.C.

(57) ABSTRACT

A power supply device includes a transformer, a rectification smoothing circuit having positive and negative output ends that rectifies and smoothes an induced voltage at a secondary winding of the transformer so as to generate a direct current voltage between positive and negative output terminals, a serial connection terminal to which another power supply device is connectable and is connected to the positive output end, the negative output terminal is connected to the negative output end, the reverse flow prevention rectifying device is connected between the positive output end and the positive output terminal, its forward direction faces toward the positive output terminal, and the bypass rectifying device is connected between the positive output end and the negative output end, its forward direction faces toward the positive output end. Therefore, a plurality of power supply devices are easily connected in series without providing external diodes for each power supply device.

4 Claims, 6 Drawing Sheets

(51) Int. Cl.
*H02M 3/335* (2006.01)
*H02M 7/04* (2006.01)
*H02J 7/00* (2006.01)
*H02M 1/00* (2006.01)

(52) U.S. Cl.
CPC ........ *H02J 2007/0059* (2013.01); *H02M 7/04* (2013.01); *H02M 2001/0077* (2013.01)

(56) References Cited

U.S. PATENT DOCUMENTS

| | | | | |
|---|---|---|---|---|
| 5,838,558 | A * | 11/1998 | Tan | H02M 3/3376 363/17 |
| 8,283,904 | B2 * | 10/2012 | Myers | H02M 3/335 323/267 |
| 2009/0316444 | A1 * | 12/2009 | Yamaguchi | H02M 3/3353 363/21.12 |
| 2014/0097747 | A1 * | 4/2014 | Bader | H01J 23/34 315/3 |

FOREIGN PATENT DOCUMENTS

| | | |
|---|---|---|
| JP | H03-030782 U | 3/1991 |
| JP | 05-276736 | 10/1993 |
| JP | H07-248852 A | 9/1995 |
| JP | H10-094252 A | 4/1998 |
| JP | H10-248261 A | 9/1998 |
| JP | 2003-244938 A | 8/2003 |
| JP | 2006-210516 A | 8/2006 |

* cited by examiner

POWER SUPPLY DEVICE AND POWER SUPPLY SYSTEM THAT HAVE A SERIAL CONNECTION TERMINAL, A REVERSE FLOW PREVENTION RECTIFYING DEVICE AND A BYPASS RECTIFYING DEVICE

CROSS-REFERENCE TO RELATED APPLICATION

This application claims priority to Japanese Patent Application Nos. 2013-015284 filed Jan. 30, 2013, and 2013-015289 filed Jan. 30, 2013 which are hereby expressly incorporated by reference herein in their entirety.

BACKGROUND

The present invention relates to a power supply device and a power supply system. Specifically, a plurality of power supply devices are connectable to each other in series. Each of the plurality of power supply devices is particularly suitable for charging a storage battery. Further, the power supply system has a configuration in which the plurality of power supply devices are connected in series.

As disclosed in Japanese Patent Publication No. H05-276736, a conventional configuration in which a plurality of power supply devices are connected in series has been known. In this configuration, a reverse flow prevention diode and a diode for bypassing an output current (also referred to as "a bypass diode" below) are externally attached to an output terminal of each power supply device (a DC-DC converter). In addition, the plurality of power supply devices to which these two diodes are externally attached are connected in series to configure a power supply system. As a result, a current (a load current) is output for a load.

According to this configuration, even when any of the power supply devices stops an operation, an output voltage of the power supply device that stops the operation is equal to or less than a forward voltage of the reverse flow prevention diode that is externally attached to the stopped power supply device. Then, the bypass diode that is externally attached to the stopped power supply device shifts to be in an ON state. Therefore, the bypass diode works as a detour and makes the output currents of other power supply devices, which are in operation states, go through the bypass diode. As a result, the plurality of power supply devices can keep supplying the output current to the load.

The power supply system described above, however, has some problems to be solved as discussed below. When the power supply system is configured with the plurality of the power supply devices that are connected in series, the reverse flow prevention diode and the bypass diode need to be separately prepared as many times as the number of power supply devices that are connected in series in the power supply system, and at the same time, need to be externally attached to each of the power supply devices. As a result, the problem of a complex interconnection exists.

In the configuration of this power supply system, when the plurality of the power supply devices are connected in series and are operated, the following state can occur in the power supply device that stops the operation. Electronic parts other than the bypass diode do not generate heat, however, only the bypass diode in which the output current continuously flows generates heat. Therefore, it is necessary to further prevent the generated heat in the bypass diode from occurring.

As disclosed in Japanese Patent Publication No. 2006-210516, a power supply device has a cooling fan that cools electronic parts such as a capacitor and a diode that configures a switching element and a rectifying circuit by forcibly exhausting the generated heat to outside a case in which the electronic parts are assembled. Thus, the cooling fan can be placed inside the power supply device together with the bypass diode.

The power supply device in which the cooling fan is placed together with the bypass diode, however, still has the following problems to be solved. Although it is possible that the electronic parts are cooled by operating the cooling fan while the power supply device is operated, the cooling fan cannot be operated while the power supply device is in a stop operation state. Therefore, as explained above, it is difficult to cool the bypass diode that generates heat in the stop operation state.

SUMMARY

The present invention attempts to solve the problems explained above. An object of the present invention is to provide a power supply device, which can be used by easily connecting a plurality of power supply devices in series without separately and independently providing a reverse flow prevention diode and a bypass diode for each power supply device, and provide a power supply system having the plurality of power supply devices explained above. Another object of the present invention is to provide a power supply device that can cool a bypass diode that generates heat when the power supply device is in a stop operation state.

To achieve the above object, a power supply device according to one aspect of the present invention includes: a transformer that has a primary winding and a secondary winding, a first voltage being intermittently applied to the primary winding, a second voltage being induced at the secondary winding in accordance with the applied first voltage; a rectification smoothing circuit that is located at a secondary side of the transformer, that has a positive output end and a negative output end, and that rectifies and smoothes the second voltage so as to generate a direct current voltage between the positive output end and the negative output end; a positive output terminal and a negative output terminal that are located at the secondary side of the transformer and that output the direct current voltage; a serial connection terminal to which another power supply device is connectable, the serial connection terminal being located at the secondary side of the transformer; a reverse flow prevention rectifying device that is located at the secondary side of the transformer; and a bypass rectifying device that is located at the secondary side of the transformer. The serial connection terminal is connected to the positive output end. The negative output terminal is connected to the negative output end. The reverse flow prevention rectifying device is connected between the positive output end and the positive output terminal. A forward direction of the reverse flow prevention rectifying device is toward the positive output terminal. The bypass rectifying device is connected between the positive output end and the negative output end. A forward direction of the bypass rectifying device is toward the positive output end.

The power supply device according to the aspect of the present invention further includes a bus bar that is made of a metal conductor and that is attached to at least one of the reverse flow prevention rectifying device and the bypass rectifying device. The bus bar forms a radiator the removes heat from the one of the reverse flow prevention rectifying device and the bypass rectifying device. The serial connection terminal is connected to the positive output end via the bus bar.

A power supply system according to the aspect of the present invention further includes two or more of the above mentioned power supply devices including first and second power supply devices. Each of the first and second power supply devices has the above mentioned elements as follow: the positive and negative output terminals; the serial connection terminal; and the direct current voltage. The first power supply device is located at a high potential side of the power supply system while the second power supply device is located at a low potential side of the power supply system. The first and second power supply devices are connected in series by connecting the negative output terminal of the first power supply device with the serial connection terminal of the second power supply device. A sum of the direct current voltage of the first power supply device, which is located at the highest potential side among the plurality of power supply devices, and the direct current voltage of the second power supply device, which is located at the lowest potential side among the plurality of power supply devices, is output between the positive output terminal of the first power supply device and the negative output terminal of the second power supply device.

As discussed above, in the power supply device according to the above aspect of the present invention, the reverse flow prevention rectifying device is connected between the positive output end and the positive output terminal. Further, the forward direction of the reverse flow prevention rectifying device faces toward the positive output terminal. At the same time, the bypass rectifying device is connected between the positive output end and the negative output end. Further, the forward direction of the bypass rectifying device faces toward the positive output end.

Therefore, in the power supply device according to the aspect of the present invention, even when the plurality of power supply devices are connected in series and are used as a power supply system, the reverse flow prevention rectifying device and the bypass rectifying device do not need to be separately and independently prepared for and be externally attached to each of the plurality of power supply devices. Therefore, the plurality of the power supply devices can be connected in series by extremely simple work. Further, in this power supply device, the serial connection terminal is directly connected to the positive output end without interposing a rectifying device. Therefore, because the power supply system is configured by connecting the plurality of the power supply devices in series by using this serial connection terminal, a voltage drop that is caused by existence of the reverse flow prevention rectifying device can be limited to be a single forward voltage corresponding to the reverse flow prevention rectifying device.

Further, in the power supply device and the power supply system according to the aspect of the present invention, the serial connection terminal is connected to the positive output end via a bus bar that is composed with a metal conductor. At least one rectifying device among the reverse flow prevention rectifying devices and the bypass rectifying devices is attached to the bus bar. As a result, the bus bar works as a radiator of the at least one rectifying device. Therefore, the bus bar can effectively radiate the heat that is generated by the at least one rectifying device.

A power supply device according to another aspect of the present invention includes: a transformer that has a primary winding and a secondary winding, a first voltage being intermittently applied to the primary winding, a second voltage being induced at the secondary winding in accordance with the applied first voltage; a rectification smoothing circuit that is located at a secondary side of the transformer, that has a positive output end and a negative output end, and that rectifies and smoothes the second voltage so as to generate a direct current voltage between the positive output end and the negative output end; a positive output terminal and a negative output terminal that are located at the secondary side of the transformer and that output the direct current voltage; a serial connection terminal to which another power supply device is connectable, the serial connection terminal being located at the secondary side of the transformer; a reverse flow prevention rectifying device that is located at the secondary side of the transformer; and a bypass rectifying device that is located at the secondary side of the transformer. The serial connection terminal is connected to the negative output end. The positive output terminal is connected to the positive output end. The reverse flow prevention rectifying device is connected between the negative output end and the negative output terminal. A forward direction of the reverse flow prevention rectifying device is toward the negative output end. The bypass rectifying device is connected between the positive output end and the negative output end. A forward direction of the bypass rectifying device is toward the positive output end.

The power supply device according to the aspect of the present invention further includes a bus bar that is made of a metal conductor and that is attached to at least one of the reverse flow prevention rectifying device and the bypass rectifying device. The bus bar forms a radiator that removes heat from the one of the reverse flow prevention rectifying device and the bypass rectifying device. The serial connection terminal is connected to the negative output end via the bus bar.

A power supply system according to the aspect of the present invention further includes two or more of the above mentioned power supply devices including first and second power supply devices. Each of the first and second power supply devices has the above mentioned elements as follow: the positive and negative output terminals; the serial connection terminal; and the direct current voltage. The first power supply device is located at a high potential side of the power supply system while the second power supply device is located at a low potential side of the power supply system. The first and second power supply devices are connected in series by connecting the serial connection terminal of the first power supply device with the positive output terminal of the second power supply device. A sum of the direct current voltage of the first power supply device, which is located at the highest potential side among the plurality of power supply devices, and the direct current voltage of the second power supply device, which is located at the lowest potential side among the plurality of power supply devices, is output between the positive output terminal of the first power supply device and the negative output terminal of the second power supply device.

As discussed above, in the power supply device according to the above aspect of the present invention, the reverse flow prevention rectifying device is connected between the negative output end and the negative output terminal. Further, the forward direction of the reverse flow prevention rectifying device faces toward the negative output terminal. At the same time, the bypass rectifying device is connected between the positive output end and the negative output end. Further, the forward direction of the bypass rectifying device faces toward the positive output end.

Therefore, in the power supply device according to the aspect of the present invention, even when the plurality of power supply devices are connected in series and are used as a power supply system, the reverse flow prevention rectifying device and the bypass rectifying device do not need to be separately and independently prepared for and be externally attached to each of the plurality of power supply devices. Therefore, the plurality of the power supply devices can be connected in series by extremely simple work. Further, in this power supply device, the serial connection terminal is directly connected to the negative output end without interposing a rectifying device. Therefore, because the power supply system is configured by connecting the plurality of the power supply devices in series by using this serial connection terminal, a voltage drop that is caused by existence of the reverse flow prevention rectifying device can be limited to be a single forward voltage corresponding to the reverse flow prevention rectifying device.

Further, in the power supply device and the power supply system according to the aspect of the present invention, the serial connection terminal is connected to the negative output end through a bus bar that is composed with a metal conductor. At least one rectifying device among the reverse flow prevention rectifying devices and the bypass rectifying devices is attached to the bus bar. As a result, the bus bar works as a radiator of the at least one rectifying device. Therefore, the bus bar can effectively radiate the heat that is generated by the at least one rectifying device.

A power supply device according to yet another aspect of the present invention includes: a transformer that has a primary winding and a secondary winding, a first voltage being intermittently applied to the primary winding, a second voltage being induced at the secondary winding in accordance with the applied first voltage; a switching element that performs a switching operation so as to intermittently apply the first voltage to the primary winding; a rectification smoothing circuit that is located at a secondary side of the transformer, that has a positive output end and a negative output end, and that rectifies and smoothes the second voltage so as to generate a direct current voltage between the positive output end and the negative output end; a positive output terminal and a negative output terminal that are located at the secondary side of the transformer and that outputs the direct current voltage; an auxiliary power supply circuit to which the first voltage is input, the auxiliary power supply circuit generating an auxiliary voltage based on the first voltage; a bypass rectifying device that is connected between the positive output end and the negative output end, a forward direction of the bypass rectifying device being toward the positive output end; a factor detection circuit that is operated by using the auxiliary voltage as an operation power source and that detects a factor of the bypass rectifying device; a cooling device that is operated by using the auxiliary voltage as an operation power source and that cools inside the power supply device; and a control circuit that is operated by using the auxiliary voltage as an operation power source and that controls the cooling device. When the detected factor is equal to or less than a predetermined threshold value, the control circuit stops an operation of the cooling device. On the other hand, when the detected factor is more than the predetermined threshold value, the control circuit starts the operation of the cooling device.

In the power supply device according to the aspect of the present invention, the factor detection circuit and the factor are respectively a temperature detection circuit and a temperature. The temperature detection circuit detects the temperature of the bypass rectifying device. When the detected temperature is equal to or less than the predetermined threshold value, the control circuit stops the operation of the cooling device. On the other hand, when the detected temperature is more than the predetermined threshold value, the control circuit starts the operation of the cooling device.

In the power supply device according to the aspect of the present invention, alternatively, the factor detection circuit and the factor are respectively a current detection circuit and a current. The current detection circuit detects the current that flows in the bypass rectifying device. When the detected current is equal to or less than the predetermined threshold value, the control circuit stops the operation of the cooling device. On the other hand, when the detected current is more than the predetermined threshold value, the control circuit starts the operation of the cooling device.

In the power supply device according to the aspect of the present invention, when an external operation instruction signal is input to the control circuit, the control circuit instructs the switching element to perform the switching operation. On the other hand, when the external operation instruction signal is not input to the control circuit, the control circuit instructs the switching element to stop the switching operation.

In the power supply device according to the aspect of the present invention, the cooling device may be a fan to cools the power supply device. Further, the fan may be dedicated to cool the bypass rectifying device.

As discussed above, in the power supply device according to the above aspect of the present invention, the bypass rectifying device is connected between the positive output end and the negative output end of the rectification smoothing circuit in advance. At this time, a forward direction of the bypass rectifying device faces toward the positive output end. As a result, even when the power supply system is configured by connecting the plurality of power supply devices in series, the bypass rectifying device does not need to be separately and independently prepared for and be externally attached to each of the plurality of power supply devices. Therefore, the plurality of power supply devices can be connected in series by extremely simple work. Further, according to the power supply device, when the power supply system is configured as explained above, even though the bypass rectifying device generates heat in the power supply device that is in a stop operation state, the power supply system can avoid the following problems. When a temperature, which is detected by the temperature detection circuit, of the bypass rectifying device exceeds a threshold temperature value, the control circuit operates a cooling device, such as a cooling fan. As a result, an outbreak, in which deteriorations and damages of the bypass rectifying device occur by the generated heat that exceeds a permissible range, can certainly be avoided.

Further, in the power supply device according to the above aspect of the present invention, the bypass rectifying device is connected between the positive output end and the negative output end of the rectification smoothing circuit in advance. At this time, a forward direction of the bypass rectifying device faces toward the positive output end. As a result, even when the power supply system is configured by connecting the plurality of power supply devices in series, the bypass rectifying device does not need to be separately and independently prepared for and be externally attached to each of the plurality of power supply devices. Therefore, the plurality of power supply devices can be connected in series by extremely simple work. Further, according to the power supply device, when the power supply system is configured as explained above, even though the bypass rectifying device generates heat, which is generated by flowing a current therein, in the power supply device that is in a stop operation state, the power supply system can avoid the following problems. When a current value, which is detected by the current detection circuit, of the bypass rectifying device exceeds a threshold current value, the control circuit operates a cooling device, such as a cooling fan. As a result, an outbreak, in which deteriorations and damages of the bypass rectifying device occur by the generated heat that exceeds a permissible range, can certainly be avoided.

Further, in the power supply device according to the above aspect of the present invention, when the operation instruction signal is input to the control signal, the control circuit instructs the switching circuit to perform the switching operation by a switching element (the power supply device shifts to an operation state, i.e., a charging state). Therefore, because the operation instruction signal is sequentially input to each of the serially connected power supply devices, each of the power supply devices sequentially shifts to the operation state. Thus, when the above configuration is compared to the conventional configuration in which a plurality of power supply devices shift to operation states and perform charging operations (this is an inefficient configuration because all power supply devices shift to operation states when a direct current voltage is low), the power supply devices according to the aspect of the present invention can improve the efficiency of the entire power supply system.

Further, in the power supply device according to the above aspect of the present invention, a dedicated cooling fan can cool only the bypass rectifying device. Therefore, as compared with a cooling fan that needs to cool an entire inside of a power supply device, using a small size cooling fan (low consumption power) as the dedicated cooling fan can reduce power that is consumed at the time of cooling the bypass rectifying device.

DESCRIPTION OF EXEMPLARY EMBODIMENTS

First Embodiment

A power supply device and a power supply system according to a first embodiment of the present invention will be explained below with reference to the drawings.

Figure 1:
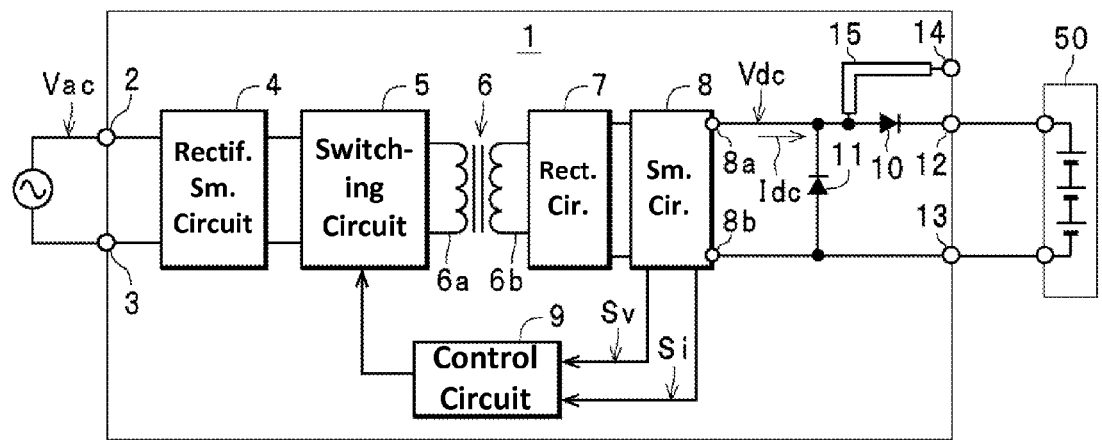
FIG. 1 is a circuit diagram that shows a configuration of a power supply device according to an embodiment of the present invention.

A power supply device 1 according to the first embodiment of the present invention shown in FIG. 1 is configured with a positive input terminal 2, a negative input terminal 3, a rectification smoothing circuit 4, a switching circuit 5, a transformer 6, a rectifying circuit 7, a smoothing circuit 8, a control circuit 9, a reverse flow prevention rectifying device 10, a bypass rectifying device 11, a positive output terminal 12, a negative output terminal 13, a serial connection terminal 14 and a bus bar 15. The power supply device 1 is configured as an insulated converter in which an input voltage that is input between the positive input terminal 2 and the negative input terminal 3 is converter into a direct current (DC) voltage Vdc as an output voltage. Specifically, although the input voltage explained above corresponds to an alternate current (AC) voltage Vac in the first embodiment according to the present invention, the input voltage can be a DC voltage. Further, the power supply device 1 can be configured with various insulated converters such as forward, flyback, bridge and push-pull converters as long as it is an insulated converter.

A rectification smoothing circuit 4 converts an AC voltage Vac to a DC voltage by rectifying and smoothing the AC voltage Vac and outputs the DC voltage. When a DC voltage is input instead of the AC voltage Vac, a smoothing circuit can be used instead of the rectification smoothing circuit 4. Further, when the number of ripples of the DC voltage that is input is small, the rectification smoothing circuit 4 can be omitted. The switching circuit 5 has a switching element (such as a transistor; not shown). The switching element is controlled by the control circuit 9 so as to repeat ON and OFF operations. As a result, the switching circuit 5 performs a switching operation for the DC voltage (i.e., an input voltage in the switching circuit 5) that is output from the rectification smoothing circuit 4 and intermittently applies the DC voltage to the transformer 6.

The transformer 6 has, as an example, a primary winding 6a and a secondary winding 6b that are electrically isolated each other. Further, because the DC voltage is intermittently applied to the primary winding 6a by the switching circuit 5, the transformer 6 induces an AC voltage at the secondary winding 6b.

The rectifying circuit 7 converts the AC voltage that is induced at the secondary winding 6b into a pulsating voltage by rectifying and outputs the pulsating voltage. The smoothing circuit 8 configures a rectification smoothing circuit together with the rectifying circuit 7. The smoothing circuit 8 converts the pulsating voltage that is rectified by the rectifying circuit 7 into a DC voltage Vdc by smoothing. Then, the DC voltage Vdc is output between the positive output end 8a and the negative output end 8b. Further, the smoothing circuit 8 has a voltage detection unit (not shown) and a current detection unit (not shown). The voltage detection unit is, for instance, configured with a voltage dividing resistance circuit and detects the DC voltage Vdc. At the same time, the voltage detection unit generates a voltage detection signal Sv and outputs it to the control circuit 9. Specifically, a voltage value of the voltage detection signal Sv changes according to a voltage value of the DC voltage Vdc. Further, the current detection unit is configured with a detection resistor of which a minute resistance value is, for instance, less than 1Ω. Further, the current detection unit detects a direct current (DC) current Idc that is output from the positive output end 8a and the negative output end 8b. At the same time, the current detection unit generates a current detection signal Si and outputs it to the control circuit 9. Specifically, a voltage value of the current detection signal Si changes according to a current value of the DC current Idc.

Figure 3:
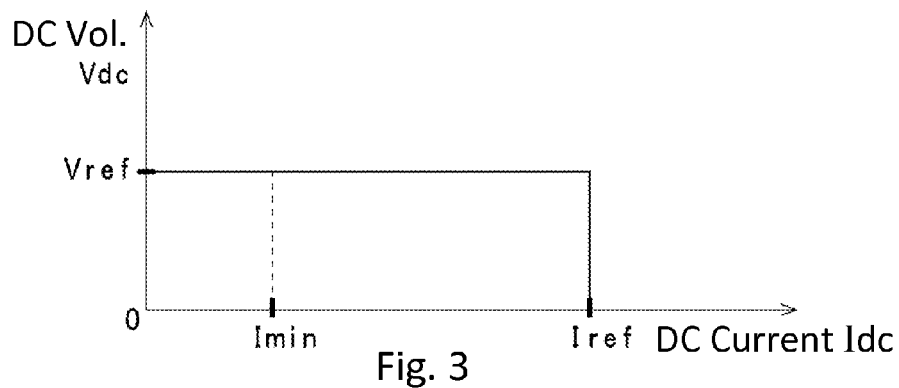
FIG. 3 is an output characteristic graph that shows a characteristic of an output voltage with respect to an output current of a power supply device according to an embodiment of the present invention.

The control circuit 9 calculates a voltage value of the present DC voltage Vdc based on the voltage detection signal Sv and calculates a current value of the present DC current Idc based on the current detection signal Si. Further, the control circuit 9 controls the switching element of the switching circuit so as to make the DC voltage Vdc and the DC current Idc change with a relationship shown in FIG. 3 (current-voltage characteristics), i.e., so as to have an overcurrent protection characteristic of a constant current voltage drooping type based on the voltage value of the present DC voltage Vdc and the current value of the present DC current Idc that are calculated.

Specifically, when the voltage value of the present DC voltage Vdc is less than a reference voltage value Vref that is defined in advance, the control circuit 9 performs a duty ratio control (or a frequency control) for the switching element of the switching circuit 5. As a result, the control circuit 9 performs constant current control so as to make the current value of the present DC current Idc correspond to a reference current value Iref that is defined in advance. Further, when the voltage value of the present DC voltage Vdc reaches the reference voltage value Vref, the control circuit 9 performs the duty ratio control (or the frequency control) for the switching element of the switching circuit 5. As a result, the control circuit 9 performs constant voltage control that makes the voltage value of the present DC voltage Vdc maintain to be the reference voltage value Vref.

Figure 2:
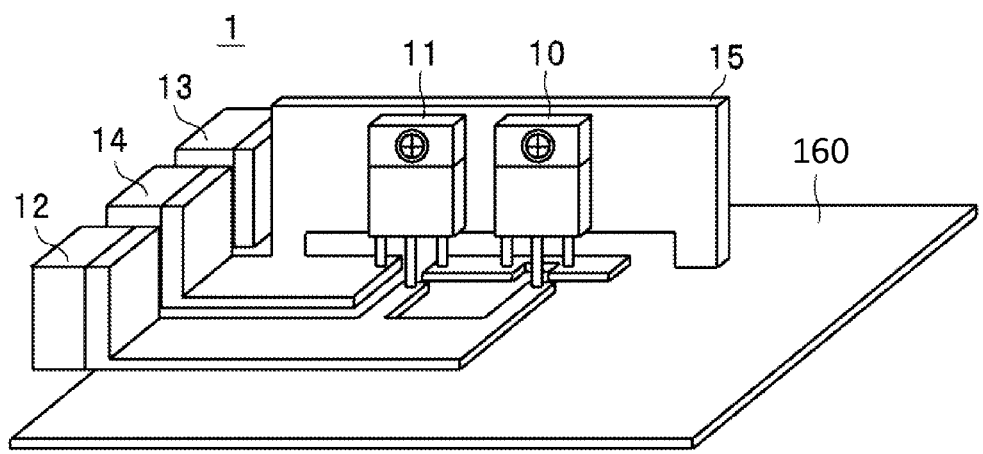
FIG. 2 is a perspective view that shows a state in which a reverse flow prevention rectifying device and a bypass rectifying device are attached to a bus bar according to an embodiment of the present invention.

The reverse flow prevention rectifying device 10 is, for example, configured with a diode and is connected in advance between the positive output end 8a of the smoothing circuit 8 and the positive output terminal 12. At this time, a forward direction of the reverse flow prevention rectifying device 10 faces toward the positive output terminal 12. The bypass rectifying device 11 is connected in advance between the positive output end 8a and the negative output end 8b of the smoothing circuit 8. At this time, a forward direction of the bypass rectifying device 11 faces toward the positive output end 8a. Specifically, the reverse flow prevention rectifying device 10 and the bypass rectifying device 11 are mounted on a circuit board 160 in the same manner as other electronic parts (not shown) that configure the power supply device 1, the positive output terminal 12, the negative output terminal 13 and the serial connection terminal 14 as shown in FIG. 2. Therefore, the reverse flow prevention rectifying device 10 and the bypass rectifying device 11 are connected in advance to positions explained above, i.e., they are formed inside the power supply device 1.

Further, at least one rectifying device of the reverse flow prevention rectifying device 10 and the bypass rectifying device 11 (both rectifying devices 10 and 11 in the embodiment) is attached to a bus bar 15 under a good thermally conductive condition while the at least one rectifying device is electrically isolated from the bus bar 15. The bus bar 15 will be explained later. Due to this configuration, the bus bar 15 works as a radiator of the rectifying device. In the embodiment, the bus bar 15 is mounted on the circuit board 160 as shown in FIG. 2.

The serial connection terminal 14 is connected to the positive output end 8a of the smoothing circuit 8. Specifically, the serial connection terminal 14 is connected to the positive output end 8a through the bus bar 15 that is composed of a metal conductor. The negative output terminal 13 is connected to the negative output end 8b of the smoothing circuit 8.

Next, an operation of the power supply device 1 according to the first embodiment of the present invention will be explained by referring with an application in which a storage battery unit 50, which is an example of a load, is charged. Specifically, the storage battery unit 50 is configured by connecting a plurality of storage batteries in series.

First, an operation for charging the storage battery unit 50 by one power supply device 1 will be explained with reference to FIG. 1. In this case, the positive output terminal 12 of the power supply device 1 is connected to a positive electrode of the storage battery unit 50 and the negative output terminal 13 is connected to a negative electrode of the storage battery unit 50.

In this state explained above, in the power supply device 1, when a voltage value of the present DC voltage Vdc is less than the reference voltage value Vref, the control circuit 9 performs the constant current control until the voltage value of the present DC voltage Vdc reaches the reference voltage value Vref. Specifically, the constant current control performs to regulate a current value of the present DC current Idc to the reference current value Iref and output it to the storage battery unit 50. Thus, charging with a constant current (a reference current value Iref) is performed for the storage battery unit 50. As a result, a charging voltage (a DC voltage Vdc) of the storage battery unit 50 increases.

After that, when the voltage value of the charging voltage (a DC voltage Vdc) of the storage battery unit 50 reaches the reference voltage value Vref, the control circuit 9 performs the constant voltage control for charging the storage battery unit 50 in a state in which the voltage value of the present DC voltage Vdc is maintained to be the reference voltage value Vref. In this case, the current value of the present DC current Idc gradually decreases from the reference current value Iref. The control circuit 9 controls the switching element of the switching circuit to be in an OFF state when the current value of the present DC current Idc reaches a predetermined minimum (lower limit) current value Imin (Imin<reference current value Iref). As a result, the control circuit 9 stops an operation for generating the DC voltage Vdc. That is, the DC voltage Vdc becomes zero volts. Therefore, the charging for the storage battery unit 50 is completed and the storage battery unit 50 is charged with a voltage (Vref−Vf1) that corresponds to subtract a forward voltage (Vf1) of the reverse flow prevention rectifying device 10 from the reference voltage value Vref.

Second Embodiment

Figure 4:
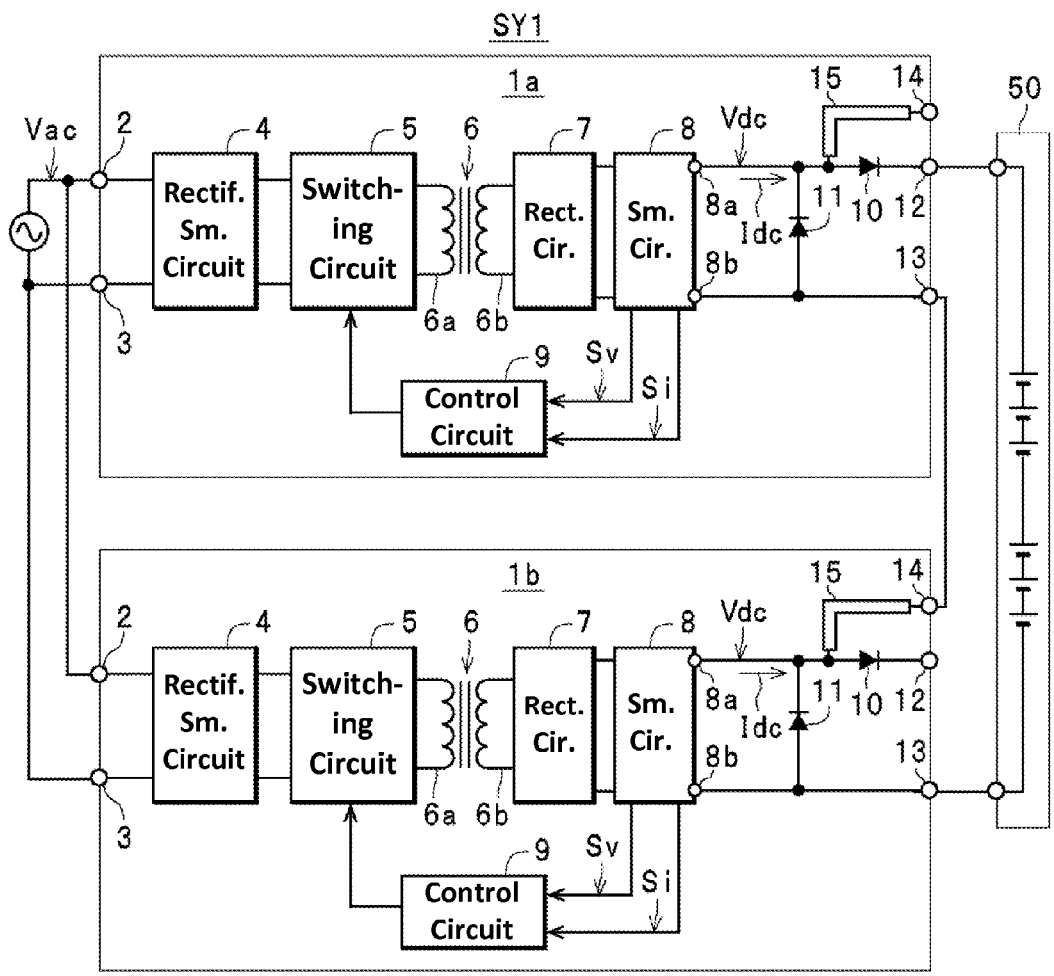
FIG. 4 is a circuit diagram that shows a configuration of a power supply system according to an embodiment of the present invention.

Next, as shown in FIG. 4, an operation for charging a storage battery unit 50 in a power supply system SY1 will be explained. Specifically, the power supply system SY1 is configured with a plurality (in this embodiment, two power supply devices) of power supply devices 1 (1a and 1b) that are connected in series.

In this case, as shown in FIG. 4, the power supply devices 1a and 1b are connected to each other in series. Specifically, the negative output terminal 13 of the power supply device 1a that is located at a high potential side and the serial connection terminal 14 of the power supply device 1b that is located at a low potential side are connected by a connecting line. Further, the positive output terminal 12 of a power supply device that is located at the highest potential side (in the second embodiment, the power supply device 1a) is connected to a positive electrode of the storage battery unit 50 by the connecting line. The negative output terminal 13 of a power supply device that is located at the lowest potential side (in the second embodiment, the power supply device 1b) is connected to a negative electrode of the storage battery unit 50 by the connecting line. Therefore, a sum of the DC voltages that are obtained by adding each of the DC voltages Vdc of each of the power supply devices 1a and 1b is output between the positive output terminal 12 of the power supply device 1a and the negative output terminal 13 of the power supply device 1b to the storage battery unit 50.

Figure 5:
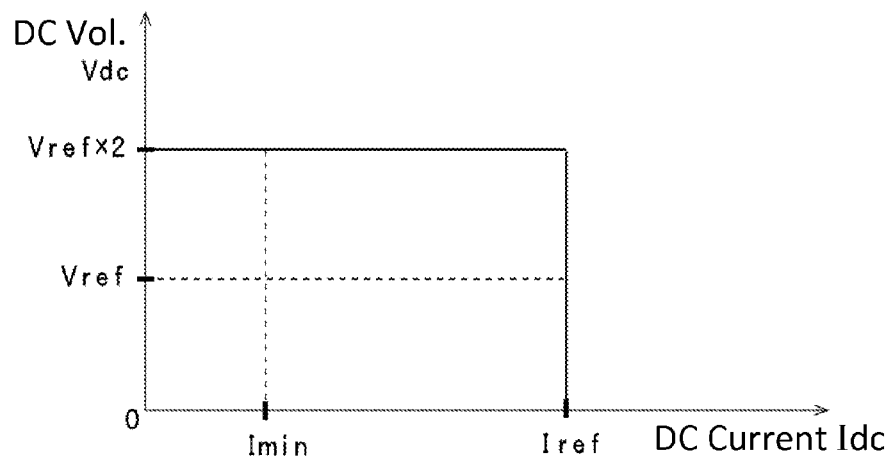
FIG. 5 is a an output characteristic graph that shows a characteristic of an output voltage with respect to an output current of a power supply system according to an embodiment the present invention.

Further, the power supply devices 1a and 1b have the same configurations. Therefore, the power supply devices 1a and 1b respectively have a current-voltage characteristic shown in FIG. 3. Therefore, the power supply system SY1 performs operations based on a current-voltage characteristic shown in FIG. 5. Specifically, when a voltage value of all the output voltages is less than a voltage value (Vref×2) (i.e., when each voltage value of each DC voltage Vdc of each of the power supply devices 1a and 1b is less than a reference voltage Vref), the power supply system SY1 performs constant current control so as to make a current value of a present DC current Idc correspond to a reference current value Iref that is defined in advance. Further, when the voltage value of all the output voltages reaches the voltage value (Vref×2) (i.e., when each voltage value of each DC voltage Vdc of each of the power supply devices 1a and 1b reaches the reference voltage Vref), the power supply system SY1 performs constant voltage control that makes the voltage value of the present output voltage maintain to be the voltage value (Vref×2).

In the above state, in the power supply devices 1a and 1b that corresponds to the power supply system SY1, when the voltage value of the present DC voltage Vdc is less than the reference voltage value Vref, each control circuit 9 performs the constant current control until the voltage value of the present DC voltage Vdc reaches the reference voltage value Vref. Specifically, the constant current control performs to regulate the current value of the present DC current Idc to the reference voltage value Vref and output it to the storage battery unit 50. Thus, constant current (reference current value Iref) charging is performed for the storage battery unit 50. As a result, a charging voltage (i.e., a DC voltage Vdc) of the storage battery unit 50 increases.

After that, when each voltage value of each DC voltage Vdc of each of the power supply devices 1a and 1b reaches the reference voltage value Vref, i.e., when the voltage value of the charging voltage of the storage battery unit 50 reaches twice the reference voltage value Vref, each control circuit 9 performs the constant voltage control for charging the storage battery unit 50 in a state in which the voltage value of the present DC voltage Vdc is maintained to be the reference voltage value Vref. In this case, a current value of a DC current Idc that is output from each of the power supply devices 1a and 1b gradually decreases from the reference current value Iref. When the current value of the present DC current Idc reaches a minimum (lower limit) current value Imin (Imin<reference current value Iref), each control circuit 9 controls a switching element of a switching circuit 5 to be in an OFF state. As a result, each control circuit 9 stops an operation for generating the DC voltage Vdc. That is, the DC voltage Vdc becomes zero volts.

Therefore, the charging for the storage battery unit 50 by the power supply devices 1a and 1b (the power supply system SY1) is completed.

In this power supply system SY1 explained above, each of the plurality of the power supply devices 1 has the serial connection terminal 14 that is dedicated for a series connection. Further, because the negative output terminal 13 of the power supply device 1a located at the high potential side and the serial connection terminal 14 of the power supply device 1b located at the low potential side are connected, the plurality of the power supply devices 1 are connected in series in a state in which the reverse flow prevention rectifying device 10 of the power supply device 1b located at the low potential side is bypassed. At the same time, only the reverse flow prevention rectifying devices 10 of a power supply device that is located at the highest potential side (in the embodiment, the power supply device 1a) can prevent a reverse flow of a current.

Thus, in the power supply system SY1, regardless of the number (n) of the power supply devices 1 that are connected in series, the storage battery unit can be charged to a voltage that is calculated by subtracting a forward voltage (Vf1) corresponding to a single reverse flow prevention rectifying device 10 from a voltage value that is obtained by multiplying the reference voltage value (vref) and the number (n) of the power supply devices 1 (Vref×n−Vr1). In contrast, in the convention power supply device explained above, when the conventional power supply device in which a plurality of power supply devices are connected in series charge a storage battery unit, the storage battery unit is charged to a voltage that is calculated by subtracting a sum of all forwarding voltage values of all reverse flow prevention rectifying devices that are externally connected from a multiplied voltage value that is calculated by multiplying the number of power supply devices and a reference voltage value. Therefore, in the power supply system SY1 according to the second embodiment of the present invention, a storage battery unit 50 can be charged to a higher voltage value compared with the conventional power supply device without providing a reverse flow prevention rectifying device 10 and a bypass rectifying device 11 for each of the power supply devices 1.

Further, also in the power supply system SY1, as a conventional power supply system in which a plurality of power supply devices are connected in series does, when output of a DC voltage Vdc from any power supply device 1 (a failed power supply device) stops while a storage battery unit 50 is charged, the storage battery unit 50 is continuously charged by shifting a bypass rectifying device 11 that is located (included) in advance in the failed power supply device to an ON state and by bypassing the failed power supply device.

As discussed above, in the power supply device 1, the reverse flow prevention rectifying device 10 is connected in advance between the positive output end 8a of the smoothing circuit 8 and the positive output terminal 12. At this time, a forward direction of the reverse flow prevention rectifying device 10 faces toward the positive output terminal 12. At the same time, the bypass rectifying device 11 is connected in advance between the positive output end 8a and the negative output end 8b of the smoothing circuit 8. At this time, a forward direction of the bypass rectifying device 11 faces toward the positive output end 8a. Therefore, according to the power supply device 1, even when the plurality of power supply devices 1 are connected in series and are used as the power supply system SY1, the reverse flow prevention rectifying devices and the bypass rectifying devices do not need to be separately and independently prepared for and be externally attached to each of the power supply devices. Therefore, the plurality of power supply devices 1 can be connected in series by extremely simple work.

Further, in the power supply device 1, the serial connection terminal 14 is directly connected (direct connection) to the positive output end 8a of the smoothing circuit 8 without interposing a rectifying device. Therefore, a voltage drop that is caused by existence of the reverse flow prevention rectifying device 10 can be limited to be the single forward voltage Vf corresponding to the reverse flow prevention rectifying device 10 because the plurality of power supply devices are connected in series by using the serial connection terminal 14.

Further, according to the power supply device 1, at least one rectifying device of the reverse flow prevention rectifying device 10 and the bypass rectifying device 11 (the reverse flow prevention rectifying device 10 in the embodiment) is electrically isolated from and attached to the bus bar 15 under a good thermally conductive condition. Therefore, heat that is generated by the at least one rectifying device can be efficiently radiated.

Third Embodiment

Figure 6:
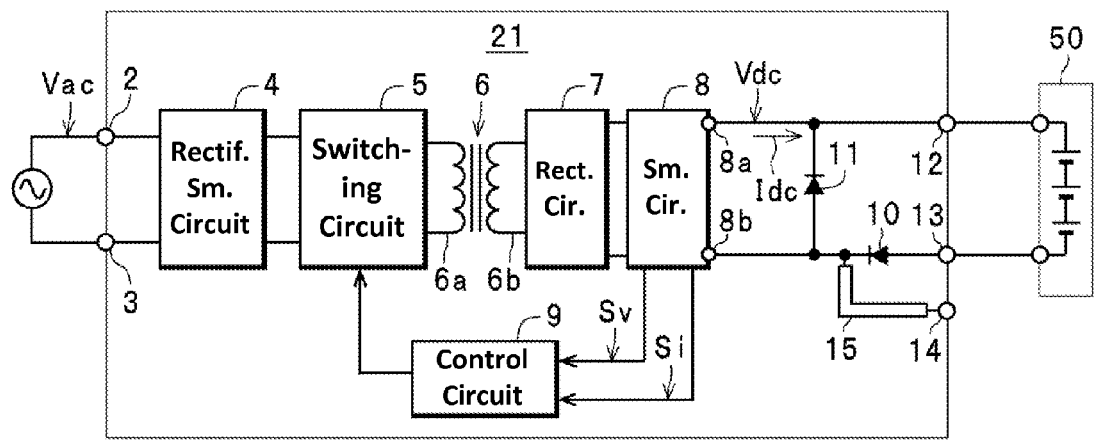
FIG. 6 is a circuit diagram that shows a configuration of a power supply device according to another embodiment of the present invention.

The power supply device 1 explained above adopts the configuration in which the serial connection terminal 14 is connected to the positive output end 8a. However, as shown in FIG. 6, in a power supply device 21, a serial connection terminal 14 can be connected to a negative output end 8b. The power supply device 21 will be explained below with reference to FIG. 6. Further, redundant explanations with respect to the same configurations as the power supply device 1 are omitted but the same reference numerals are used for labeling.

The power supply device 21 shown in FIG. 6 is configured with a positive input terminal 3, a negative input terminal 3, a rectification smoothing circuit 4, a switching circuit 5, a transformer 6, a rectifying circuit 7, a smoothing circuit 8, a control circuit 9, a reverse flow prevention rectifying device 10, a bypass rectifying device 11, a positive output terminal 12, a negative output terminal 13, a serial connection terminal 14 and a bus bar 15. The power supply device is configured the same as the power supply device 1 except a connecting location of the reverse flow prevention rectifying device 10, the serial connection terminal 14 and the bus bar 15. Different configurations of the power supply device 21 compared with the power supply device 1 are mainly explained below.

The reverse flow prevention rectifying device is configured with a diode and is connected in advance between the negative output end 8b of the smoothing circuit 8 and the negative output terminal 13. At this time, a forward direction of the reverse flow prevention rectifying device 10 faces toward the negative output end 8b. The serial connection terminal is connected to the negative output end 8b of the smoothing circuit 8. Specifically, the serial connection terminal 14 is connected to the negative output end 8b through the bus bar 15 that is composed of a metal conductor. Further, the positive output terminal 12 is connected to the positive output end 8a of the smoothing circuit 8.

Next, an operation of the power supply device will be explained with reference to an example of charging a storage battery unit 50 that corresponds to a load.

First, an operation in which the storage battery unit 50 is charged by one power supply device 21. In this case, the positive output terminal 12 of the power supply device 21 is connected to a positive electrode of the storage battery unit 50. At the same time, the negative output terminal 13 of the power supply device 21 is connected to a negative electrode of the storage battery unit 50. Further, the power supply device 21 charges the storage battery unit 50 to a voltage (Vref−Vf1) in the same manner as the power supply device 1 as explained above.

Fourth Embodiment

Next, an operation of charging a storage battery unit 50 in a power supply system SY2 will be explained with reference to FIG. 7. Specifically, the power supply system SY2 is configured with a plurality (in the embodiment, two) of the power supply devices 21 (21a, 21b) that are connected in series.

Figure 7:
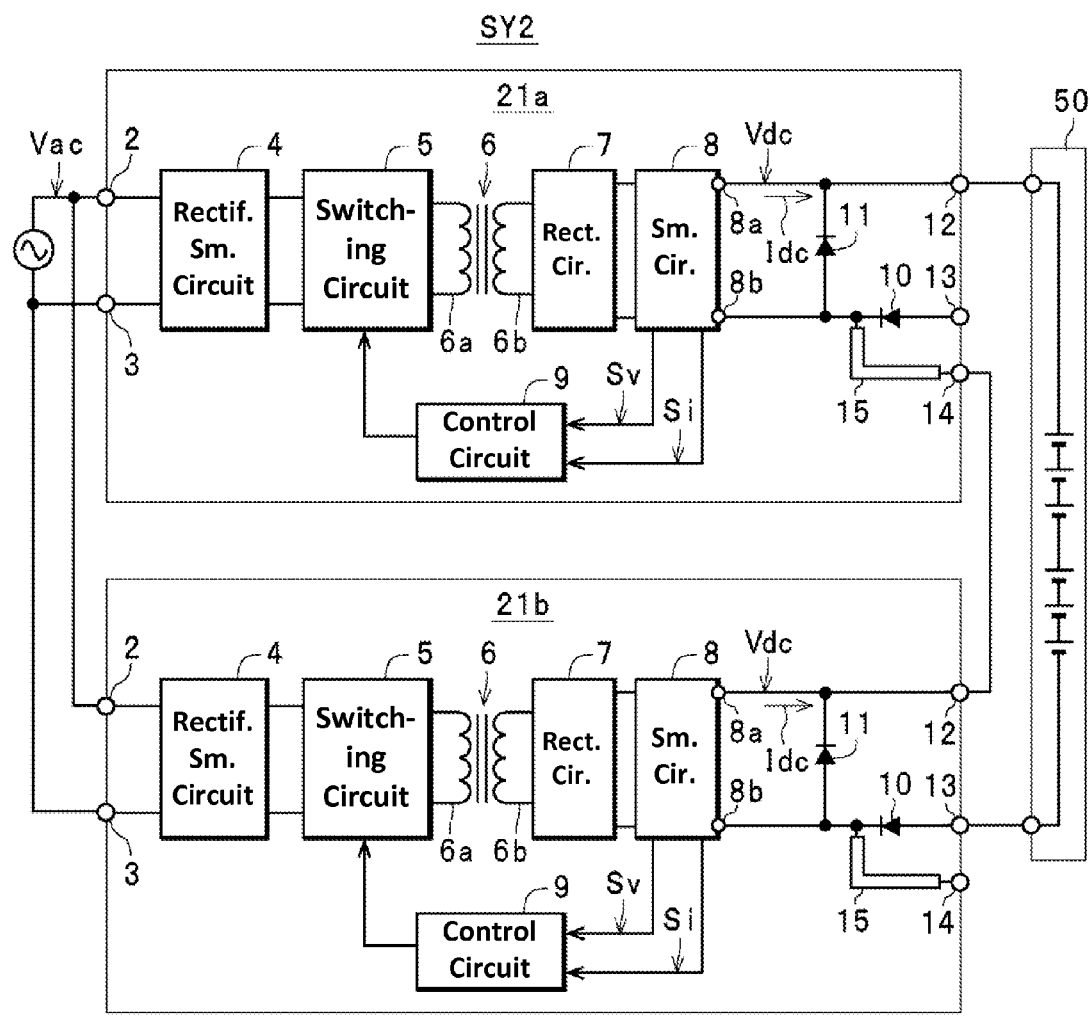
FIG. 7 is a circuit diagram that shows a configuration of a power supply system according to another embodiment of the present invention.

In this embodiment, as shown in FIG. 7, the power supply devices 21a and 21b are connected to each other in series by connecting a serial connection terminal 14 of the power supply device 21a located at a high potential side with a positive output terminal 12 of the power supply device 21b located at a low potential side. Further, the positive output terminal of a power supply device located at the highest potential side (in the embodiment, the power supply device 21a) is connected to a positive electrode of the storage battery unit 50. The negative output terminal of a power supply device located at the lowest potential side (in the embodiment, the power supply device 21b) is connected to a negative electrode of the storage battery unit 50. Therefore, a sum of the DC voltages Vdc that is obtained by adding each DC voltage Vdc of each of the power supply devices 21a and 21b is output between the positive output terminal 12 of the power supply device 21a and the negative output terminal 13 of the power supply device 21b to the storage battery unit 50.

In the power supply devices 21a and 21b (the power supply system SY2), the storage battery unit 50 is charged to a voltage (Vref×n−Vf1) in the same manner as the power supply system SY1 explained above except the following state. The state is that only the reverse flow prevention rectifying device 10 of the power supply device (the power supply device 21b in this embodiment), which is located at the lowest potential side, prevents a reverse flow of a current. Further, the number of the power supply devices "n" is equal to two (2) in this embodiment.

Therefore, in the power supply device 21, the reverse flow prevention rectifying device 10 and the bypass rectifying device are connected in advance in the same manner as the power supply device 1 explained above. Even when the plurality of power supply devices 21 are connected in series and are used as the power supply system SY2, the reverse flow prevention rectifying devices and the bypass rectifying devices do not need to be separately and independently prepared for and be externally attached to each power supply device. Therefore, the plurality of power supply devices 21 can be connected in series by extremely simple work.

Further, in the power supply device 21, the serial connection terminal 14 is directly connected (i.e., a direct connection) to the negative output end 8b of the smoothing circuit 8 without interposing a rectifying device. Therefore, according to the power supply system SY2 that is configured by connecting the plurality of power supply devices 21 in series by using the serial connection terminal 14, a voltage drop that is caused by existence of the reverse flow prevention rectifying device 10 can be limited to the single forward voltage Vf corresponding to the reverse flow prevention rectifying device 10.

According to the power supply device 21, at least one rectifying device (the reverse flow prevention rectifying device 10 in this embodiment) of the reverse flow prevention rectifying device 10 and the bypass rectifying device 11 is electrically isolated from and is attached to a bus bar 15 under a good thermally conductive condition. Therefore, heat that is generated by the at least one rectifying device can efficiently be radiated by the bus bar 15.

Fifth Embodiment

A fifth embodiment of a power supply device 100 will be explained below with reference to the drawings.

Figure 8:
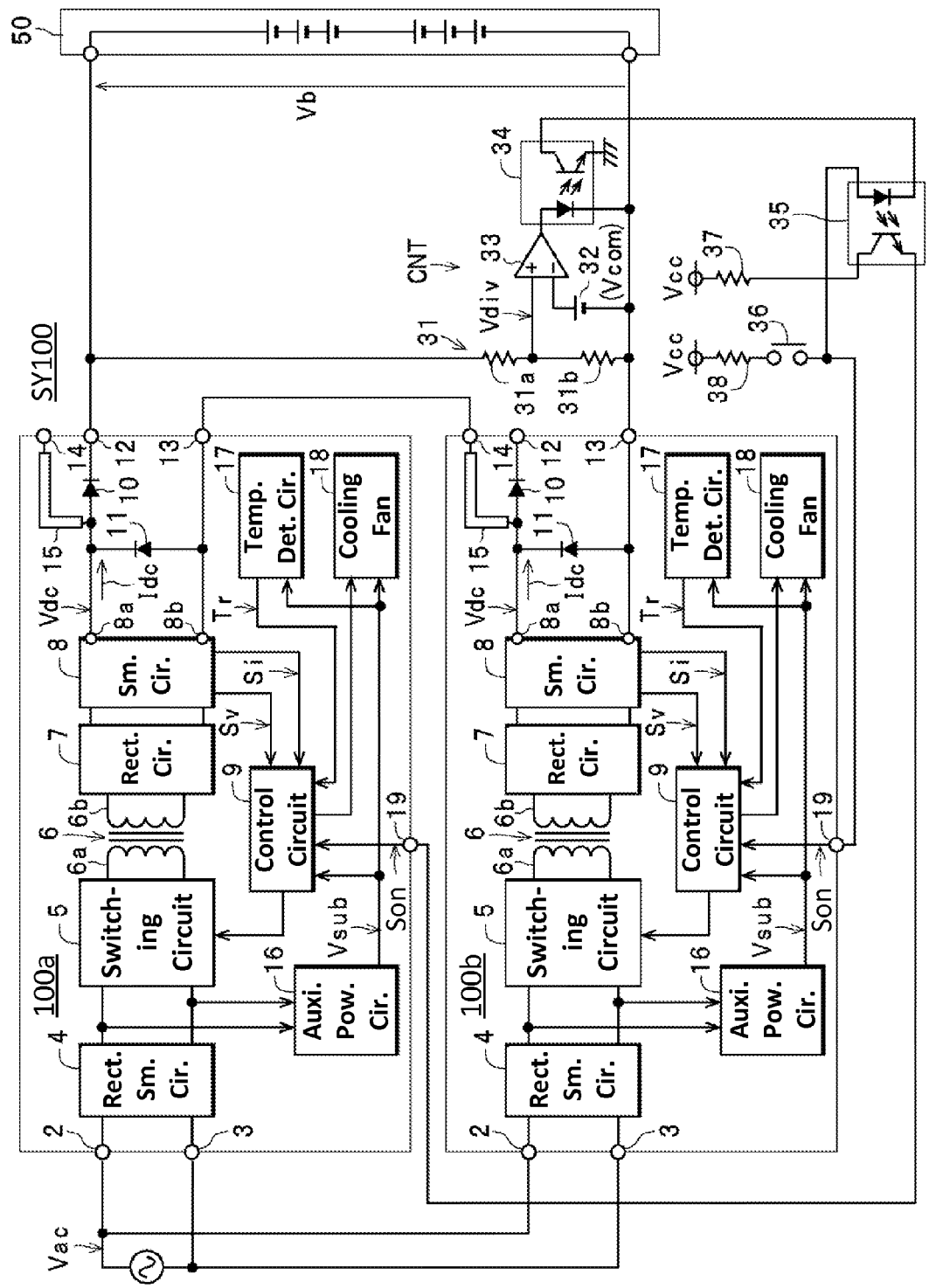
FIG. 8 is a circuit diagram that shows a configuration of a power supply device and a power supply system according to another embodiment of the present invention.

The power supply device 100 (in this embodiment, two power supply devices 100a and 100b) shown in FIG. 8 is configured with a positive input terminal 2, a negative input terminal 3, a rectification smoothing circuit 4, a switching circuit 5, a transformer 6, a rectifying circuit 7, a smoothing circuit 8, a control circuit 9, a reverse flow prevention rectifying device 10, a bypass rectifying device 11, a positive output terminal 12, a negative output terminal 13, a serial connection terminal 14, a bus bar 15, an auxiliary power supply circuit 16, a temperature detection circuit 17, a cooling fan 18 and an control input terminal 19. Further, the power supply device 100 is configured as an insulated type converter in which an external input voltage is converted to a DC voltage Vdc that is output between the positive output terminal 12 and the negative output terminal 13 to an outside (load). Specifically, the external input voltage corresponds to an AC voltage Vac. However, it can also be a DC voltage. Further, the power supply device 100 can be configured with various insulated converters such as forward, flyback, bridge and push-pull converters as long as it is an insulated converter.

The rectification smoothing circuit 4 converts an AC voltage Vac to a DC voltage by rectifying and smoothing the AC voltage Vac and outputs the DC voltage. When a DC voltage is input instead of the AC voltage Vac, a smoothing circuit can be used instead of the rectification smoothing circuit 4. Further, when the number of ripples of the DC voltage that is input is small, the rectification smoothing circuit 4 can be omitted. The switching circuit 5 has a switching element (such as a transistor; not shown). The switching element is controlled by the control circuit 9 so as to repeat ON and OFF operations. As a result, the switching circuit 5 performs a switching operation for the DC voltage (i.e., an input voltage in the switching circuit 5) that is output from the rectification smoothing circuit 4 and intermittently applies the DC voltage to the transformer 6.

The transformer 6 has, as an example, a primary winding 6a and a secondary winding 6b that are electrically isolated each other. Further, because the DC voltage is intermittently applied to the primary winding 6a by the switching circuit 5, the transformer 6 induces an AC voltage at the secondary winding 6b.

The rectifying circuit 7 converts the AC voltage that is induced at the secondary winding 6b into a pulsating voltage by rectifying and outputs the pulsating voltage. The smoothing circuit 8 configures a rectification smoothing circuit together with the rectifying circuit 7. The smoothing circuit 8 converts the pulsating voltage that is rectified by the rectifying circuit 7 into a DC voltage Vdc by smoothing. Then, the DC voltage Vdc is output between the positive output end 8a and the negative output end 8b. Further, the smoothing circuit 8 has a voltage detection unit (not shown) and a current detection unit (not shown). The voltage detection unit is, for instance, configured with a voltage dividing resistance circuit and detects the DC voltage Vdc. At the same time, the voltage detection unit generates a voltage detection signal Sv and outputs it to the control circuit 9. Specifically, a voltage value of the voltage detection signal Sv changes according to a voltage value of the DC voltage Vdc. Further, the current detection unit is configured with a detection resistor of which a minute resistance value is, for instance, less than 1Ω. Further, the current detection unit detects a direct current (DC) current Idc that is output from the positive output end 8a and the negative output end 8b. At the same time, the current detection unit generates a current detection signal Si and outputs it to the control circuit 9. Specifically, a voltage value of the current detection signal Si changes according to a current value of the DC current Idc.

The control circuit 9 operates by receiving an auxiliary voltage Vsub from the auxiliary power supply circuit 16. At this time, the auxiliary voltage Vsub works as an operating power supply for the control circuit 9. When an operation instruction signal Son is externally input to the control circuit 9 from outside through the control input terminal 19, the control circuit 9 instructs to perform switching control with respect to a switching element of the switching circuit 5.

In this switching control, the control circuit calculates a voltage value of the present DC voltage Vdc based on the voltage detection signal Sv and calculates a current value of the present DC current Idc based on the current detection signal Si. Further, the control circuit 9 performs a duty ratio control (or a frequency control) for the switching element of the switching circuit 5 based on the calculated voltage value of the present DC voltage Vdc and the calculated current value of the present DC current Idc. As a result, when the present DC current Idc is less than a reference current value that is not overcurrent, the control circuit 9 outputs the DC voltage Vdc by the reference voltage value of a constant voltage value. Further, when the present DC current Idc reaches the reference voltage value, the control circuit 9 decreases the voltage value of the DC voltage Vdc from the reference voltage value while the DC current Idc is maintained to be the reference current value. As a result, the power supply device 100 is configured to have an overcurrent protection characteristic of a constant current voltage drooping type. Further, because the power supply device 100 has the overcurrent protection characteristic, the power supply device 100 performs the constant current control so as to make the current value of the DC current Idc correspond to the reference voltage value in the beginning during a charging operation for a battery. When the charging voltage of the battery reaches the reference voltage value, the power supply device 100 performs the constant voltage control so as to make the voltage value of the DC voltage Vdc correspond to the reference voltage value.

The control circuit 9 performs a fan control regardless of existence or non-existence of an input of the operation instruction signal Son. In the fan control, as discussed later, when a temperature Tr of the bypass rectifying device 11 that is detected in the temperature detection circuit 17 is equal to or less than a threshold temperature Tth that is defined in advance, the control circuit 9 stops the cooling fan 18. When the temperature Tr exceeds the threshold temperature Tth, the control circuit 9 operates the cooling fan 18. In this case, the temperature detection circuit 17 detects any temperature among a temperature of the bypass rectifying device 11 itself, a temperature of a heat sink for the bypass rectifying device 11 and a temperature around the bypass rectifying device 11 as a "temperature regarding the bypass rectifying device 11." Specifically, the temperatures explained above correspond to a temperature that is changed in accordance with heat generated in the bypass rectifying device 11. In this embodiment, the temperature detection circuit 17 detects the temperature around the bypass rectifying device 11 as the "temperature regarding the bypass rectifying device 11."

The reverse flow prevention rectifying device is, for example, configured with a diode and is connected in advance between the positive output end 8a of the smoothing circuit 8 and the positive output terminal 12. At this time, a forward direction of the reverse flow prevention rectifying device 10 faces toward the positive output terminal 12. The bypass rectifying device 11 is connected in advance between the positive output end 8a and the negative output end 8b of the smoothing circuit 8. At this time, a forward direction of the bypass rectifying device 11 faces toward the positive output end 8a. Specifically, the reverse flow prevention rectifying device 10 and the bypass rectifying device 11 are mounted on a circuit board (not shown) in the same manner as other electronic parts (not shown) that configure the power supply device 100. Therefore, the reverse flow prevention rectifying device 10 and the bypass rectifying device 11 are connected in advance to positions explained above, i.e., they are formed inside the power supply device 100.

Further, at least one rectifying device of the reverse flow prevention rectifying device 10 and the bypass rectifying device 11 is attached to the bus bar 15 under a good thermally conductive condition while the at least one rectifying device is electrically isolated from the bus bar 15. Due to this configuration, the bus bar 15 works as a radiator of the rectifying device. In the embodiment, the reverse flow prevention rectifying device 10 is attached to the bus bar 15.

The serial connection terminal 14 is connected to the positive output end 8a of the smoothing circuit 8. Specifically, the serial connection terminal 14 is connected to the positive output end 8a through the bus bar 15 that is composed of a metal conductor. The negative output terminal 13 is connected to the negative output end 8b of the smoothing circuit 8.

In the auxiliary power supply circuit 16, an auxiliary voltage (a current voltage) Vsub is generated based on the DC voltage (an input voltage in the switching circuit 5) that is output from the rectification smoothing circuit 4 and is supplied (output) to the control circuit 9, the temperature detection circuit 17 and the cooling fan 18. According to the configuration, when the external input voltage (an AC voltage Vac in the embodiment) is supplied, the auxiliary power supply circuit 16 generates the auxiliary voltage Vsub and outputs even though the switching operation of the switching circuit 5 is in a stop operation state (in a state in which the power supply device 100 is in a stop operation state).

The temperature detection circuit 17 is configured with various contact type temperature sensors or various noncontact type temperature sensors. At the same time, the temperature detection circuit 17 operates by receiving the auxiliary voltage Vsub and detects the temperature Tr regarding the bypass rectifying device 11. Further, the temperature Tr is output to the control circuit 9.

The cooling fan 18 operates under control of the control circuit 9 by receiving the auxiliary voltage Vsub and cools the inside of the power supply device 100. Because the inside of the power supply device 100 is cooled by the cooling fan 18, each of the electronic parts that are located at the primary side of the transformer 6 and each of the electronic parts (including the reverse flow prevention rectifying device 10 and the bypass rectifying device 11) that are located at the secondary side of the transformer 6 are cooled.

Next, an operation of the power supply device 100 will be explained with reference to an example for charging the storage battery unit 50 (a unit that is configured with a plurality of storage batteries connected in series) that corresponds to an example of a load in a state in which a power supply system SY100 is configured with a plurality of the power supply devices 100 (two power supply devices 100a and 100b in the embodiment as shown in FIG. 8) that are connected in series.

First, a configuration of the power supply system SY100 will be explained. The power supply system SY100 is configured with two power supply devices 100a, 100b and an external control circuit CNT. Specifically, the external control circuit CNT is located outside of each of the power supply devices 100a and 100b and performs integrated control to the operation of each of the power supply devices 100a and 100b.

In this case, as shown in FIG. 8, the power supply devices 100a and 100b are connected to each other in series. Specifically, the negative output terminal 13 of the power supply device 100a that is located at a high potential side and the serial connection terminal 14 of the power supply device 100b that is located at a low potential side are connected by a connecting line. Further, the positive output terminal 12 of a power supply device that is located at the highest potential side (in the fifth embodiment, the power supply device 100a) is connected to a positive electrode of the storage battery unit 50 by the connecting line. The negative output terminal 13 of a power supply device that is located at the lowest potential side (in the fifth embodiment, the power supply device 100b) is connected to a negative electrode of the storage battery unit 50 by the connecting line. Therefore, a sum of the DC voltages that are obtained by adding each of the DC voltages Vdc of each of the power supply devices 100a and 100b is output between the positive output terminal of the power supply device 100a and the negative output terminal 13 of the power supply device 100b to the storage battery unit 50.

The external control circuit CNT is configured with a voltage detection circuit 31, a reference power supply 32, a comparator 33, photocouplers 34 and 35, a starting switch 36, and resistors 37 and 38. Specifically, the voltage detection circuit 31 detects and outputs the DC voltage Vdc of the power supply device 100b. The resistor 37 pulls up a collector terminal of the transistor that is included in the photocoupler 35 to the external power supply voltage Vcc. The resistor 38 pulls up one terminal of the starting switch 36 to the external power supply voltage Vcc.

The voltage detection circuit 31 is configured with a voltage dividing circuit that is composed with two resistors 31a and 31b that are connected in series. Further, the voltage detection circuit 31 are connected between the positive output terminal 12 of the power supply device (the power supply device 100a in the embodiment) that is located at the highest potential side and the negative output terminal 13 of the power supply device (the power supply device 100b in the embodiment) that is located at the lowest potential side. Further, the voltage detection circuit 31 outputs a divided voltage Vdiv in which a voltage value is changed according to the voltage value of the charging voltage Vb by dividing the charging voltage Vb of the storage battery unit 50. Specifically, the charging voltage Vb of the storage battery unit 50 corresponds to an added voltage (the output voltage of the power supply system SY100) of the DC voltage Vdc that is output from each of the power supply devices 100a and 100b.

The reference power supply 32 generates and outputs a comparison voltage Vcom of a prescribed voltage by using a potential of the negative output terminal 13 of the power supply device 100b as a standard. The comparator 33 compares the comparison voltage Vcom with the divided voltage Vdiv. As a result, when the divided voltage Vdiv is equal to or less than the comparison voltage Vcom, the comparator 33 outputs an L level voltage that is the same potential as the negative output terminal 13. Similarly, when the divided voltage Vdiv exceeds the comparison voltage Vcom, the comparator 33 outputs an H level voltage that is a higher voltage than a forward voltage of a diode. In this embodiment, when the charging voltage Vb reaches a threshold voltage that is defined in advance, i.e., when the charging voltage Vb reaches a voltage value of the reference voltage value of the power supply device 100 or a vicinity voltage value thereof (for instance, the voltage value is about 80% of the reference voltage value), a division rate for resistors 31a and 31b and the comparison voltage Vcom are defined in advance so as to make the divided voltage Vdiv exceed the comparison voltage Vcom and make the comparator 33 output the H level voltage.

An anode terminal of a photodiode of the photocoupler 34 is connected to an output terminal of the comparator 33. At the same time, a cathode terminal of the photodiode of the photocoupler 34 is connected to a potential of the negative output terminal 13 in the power supply device 100b. Further, an emitter terminal of a phototransistor of the photocoupler 34 is connected to a reference potential (a ground potential) with respect to an external power supply voltage Vcc. At the same time, a collector terminal of the phototransistor of the photocoupler 34 is connected to a cathode terminal of a photodiode of the photocoupler 35.

An anode terminal of the photodiode of the photocoupler 35 is connected to one terminal of the starting switch 36. At the same time, the cathode terminal of the photodiode of the photocoupler 35 is connected to the photocoupler 34 as explained above. Further, an emitter terminal of a phototransistor of the photocoupler 35 is connected to the control input terminal 19 of the power supply device 100a located at a high potential side. At the same time, a collector terminal of the phototransistor of the photocoupler 35 is pulled up to the external power supply voltage Vcc through the resistor 37 as explained above.

The other terminal of the starting switch 36 is pulled up to the external power supply voltage Vcc as explained above. At the same time, the one terminal of the starting switch 36 is connected to the control input terminal 19 of the power supply device 100b located at a low potential side. According to this configuration, when the starting switch 36 is turned to be in an ON state, the starting switch 36 outputs an H level signal (a voltage as substantially the same as the voltage value of the external power supply voltage Vcc) as an operation instruction signal Son.

Next, an operation of the power supply system SY100 as well as an operation of each power supply device 100 will be explained.

In the external control circuit CNT, when the starting switch 36 is in an OFF state, the operation instruction signal Son is not output to the power supply device 100b. Further, the H level signal is not applied to the anode terminal of the photodiode of photocoupler 35. Therefore, because the phototransistor of the photocoupler 35 is also in the OFF state, the operation instruction signal Son is not output to the power supply device 100a as well. As a result, both power supply devices 100a and 100b are maintained to stop (to be in a stop operation state).

In the state explained above, when the starting switch 36 is operated to be in the ON state, the operation instruction signal Son is output to the power supply device 100b. As a result, in the power supply device 100b, the control circuit 9 starts to perform the switching control for the switching element of the switching circuit 5 (shifts to be in an operating state). When the charging voltage Vb of the storage battery unit during an initial charging phase is lower than the reference voltage value, the power supply device 100b regulates a current value of a present DC current Idc as the reference current value and performs constant current control so as to output the regulated current to the storage battery unit 50 until the charging voltage Vb of the storage battery unit 50 reaches the reference voltage value. In the above case, because the power supply device 100a is in a stop operation state as discussed below, the above charging voltage Vb corresponds to a voltage that is obtained by subtracting a forward voltage Vf of each of the diodes 10 and 11 of the power supply device 100a from the DC voltage Vdc that is output from the power supply device 100b.

On the other hand, although the H level signal is applied to the anode terminal of the photodiode of the photocoupler 35, the divided voltage Vdiv that is output from the voltage detection circuit 31 is less than the comparison voltage Vcom that is output from the reference power supply 32 until the charging voltage Vb reaches the threshold voltage as discussed above. Therefore, because the comparator 33 outputs the L level voltage, the phototransistor of the photocoupler 34 maintains the OFF state. Thus, because a current does not flow in the photodiode of the photocoupler 35, the phototransistor of the photocoupler 35 maintains the OFF state. Therefore, since the operation instruction signal Son is not applied to the power supply device 100a located at the high potential side, the power supply device 100a maintains the stop operation state.

As a result, the DC current Idc that is output from the power supply device 100b is supplied to the storage battery unit 50 after the DC current Idc passes through the negative output terminal 13 of the power supply device 100a, the bypass rectifying device 11, the reverse flow prevention rectifying device 10 and the positive output terminal 12. In other words, the DC current Idc flows by bypassing the power supply device 100a that is in the stop operation state. Thus, the charging by the constant current (the reference current value) for the storage battery unit 50 is performed.

Because the storage battery unit 50 is further charged by the DC current Idc that is output from the power supply device 100b, the charging voltage Vb of the storage battery unit 50 increases. Then, when the charging voltage Vb reaches a threshold voltage, the divided voltage div that is output from the voltage detection circuit 31 exceeds the comparison voltage Vcom. Therefore, the comparator 33 starts to output the H level voltage. Thus, because a current flows in the photodiode of the photocoupler 34, the phototransistor of the photocoupler 34 is turned ON. As a result, because a current also flows in the photodiode of the photocoupler 35, the phototransistor of the photocoupler is also turned ON. Therefore, the operation instruction signal Son is output to the power supply device 100a located at the high potential side.

As a result, in the power supply device 100a, the control circuit 9 starts to perform switching control for the switch element of the switching circuit 5 (shifting to an operation state). In this case, the charging voltage Vb of the storage battery unit 50 does not reach a chargeable maximum voltage by the power supply devices 100a and 100b that are connected in series. In other words, the charging voltage Vb does not reach an added voltage value that is obtained by adding each of the reference voltage values of the power supply devices 100a and 100b. Thus, each of the DC voltages Vdc that are output from the power supply devices 100a and 100b is less than each of the reference voltage values. Each of the power supply devices 100a and 100b keeps performing the constant current control by regulating the current value of the present DC current Idc as the reference current value and by providing the regulated current to the storage battery unit 50 until each of the DC voltages Vdc reaches each of the reference voltage values (until the charging voltage Vb of the storage battery unit 50 reaches the added voltage value of each of the reference voltage values).

In a case in which the power supply device 100b shifts to an operation state (an initial state of the charging) by placing the starting switch 36 in the ON state, when the charging voltage Vb of the storage battery unit 50 is higher than the threshold voltage, the operation instruction signal Son is output to the power supply device 100a located on the high potential side by operating the external control circuit CNT as discussed above. Thus, the power supply devices 100a and 100b immediately shift to the operation states so as to perform the constant current control, i.e., regulating the current value of the DC current Idc as the reference current value and output the regulated current to the storage battery unit 50 as discussed above. In other words, the storage battery unit 50 starts to be charged.

After that, when each voltage value of each DC voltage Vdc of each of the power supply devices 100a and 100b reaches each of the reference voltage values, i.e., when the voltage value of the charging voltage Vb of the storage battery unit 50 reaches an added voltage value of each reference voltage value, each control circuit 9 performs the constant voltage control for charging the storage battery unit 50 in a state in which the voltage value of the present DC voltage Vdc is maintained to be the reference voltage value. Specifically, the added voltage value of each reference voltage value corresponds to a voltage value that is calculated by subtracting the forward voltage Vf of the reverse flow prevention rectifying device 10 located at the side of the power supply device 100a from a sum of the voltage values of each reference voltage value. In this case, the current value of the DC current Idc that is output to the storage battery unit 50 from each of the power supply devices 100a and 100b gradually decreases from the reference voltage value Vref. When the current value of the present DC current Idc reaches a minimum (lower limit) current value Imin (Imin<reference voltage value Vref), each control circuit 9 controls the switching element of the switching circuit 5 to be in the OFF state. As a result, the control circuit 9 stops a generation operation of the DC voltage Vdc. That is, the DC voltage Vdc becomes zero volts. Therefore, the charging for the storage battery unit 50 by the power supply devices 100a and 100b (the power supply system SY100) is completed.

In each of the power supply devices 100a and 100b of the power supply system SY100, not only when the charging operation is performed for the storage battery unit 50, but also when the charging operation is not performed (when the operation instruction signal Son is not input), each control circuit 9 performs the fan control as explained above and each temperature detection circuit 17 performs the temperature detection. In this case, when only the power supply device 100b performs the charging operation in the operating state, and even when the power supply device 100a is in a stop operation state, the bypass rectifying device 11 of the power supply device 100a generates heat because the DC current Idc continuously flows in the bypass rectifying device 11 of the power supply device 100a. At this time, the temperature detection circuit 17 of the power supply device 100a detects a temperature Tr of the bypass rectifying device 11 and outputs the detected temperature Tr to the control circuit 9. Therefore, when the temperature Tr of the bypass rectifying device 11 that is output from the temperature detection circuit exceeds the threshold temperature Tth, the control circuit 9 of the power supply device 100a operates the cooling fan 18. As a result, in the power supply device 100a, even when the charging operation is not performed (is in the stop operation state), an outbreak of a state, in which the bypass rectifying device 11 deteriorates or is damaged by the generated heat that exceeds a permissible range, can be avoided.

Thus, in the power supply device 100, the bypass rectifying device 11 is connected in advance between the positive output end 8a and the negative output end 8b of the smoothing circuit 8. At this time, a forward direction of the bypass rectifying device 11 faces toward the positive output end 8a. Therefore, according to the power supply device 100, when the plurality of power supply devices 100 are connected in series and configures the power supply system SY100, the bypass rectifying device does not need to be separately and independently prepared for and be externally attached to each of the power supply devices. Therefore, the plurality of power supply devices 100 can be connected in series by extremely simple work.

Further, according to the power supply device 100, in a case in which the power supply system SY100 is configured by connecting the plurality of power supply devices explained above, even when the bypass rectifying device 11 located in the power supply device 100 that is in the stop operation state generates heat, the control circuit 9 operates the cooling fan 18 when a temperature Tr of the bypass rectifying device 11 detected by the temperature detection circuit 7 exceeds the threshold temperature Tth. As a result, an outbreak of a state, in which the bypass rectifying device 11 deteriorates or is damaged by its generated heat that exceeds a permissible range, can certainly be avoided.

In the power supply device 100, the serial connection terminal 14 is directly connected (direct connection) to the positive output end 8a of the smoothing circuit 8 without interposing a rectifying device. Therefore, a voltage drop that is caused by existence of the reverse flow prevention rectifying device 10 can be limited to be the single forward voltage Vf corresponding to the reverse flow prevention rectifying device 10 because the plurality of power supply devices 100 are connected in series by using the serial connection terminal 14.

Further, according to the power supply device 100, at least one rectifying device of the reverse flow prevention rectifying device 10 and the bypass rectifying device 11 (the reverse flow prevention rectifying device 10 in the embodiment) is electrically isolated by the bus bar 15 and attached to the bus bar 15 under a good thermally conductive condition. Therefore, heat that is generated by the at least one rectifying device can efficiently be radiated by operating the cooling fan 18.

Sixth Embodiment

Further, in the above explained power supply device 100, the following configuration is adopted. A degree of the generated heat of the bypass rectifying device 11 is detected by using the temperature detection circuit 17 that detects the temperature Tr of the bypass rectifying device 11. As explained above, the generation of heat of the bypass rectifying device 11 occurs because the DC current Idc flows in the bypass rectifying device 11. Therefore, in a power supply device 200 shown in FIG. 9 (as an example, two power supply devices 200a and 200b in FIG. 9), a configuration, in which a degree of generated heat of a bypass rectifying device 11 is detected by using a current detection circuit 22 that detects a DC current Idc that flows in the bypass rectifying device 11, can also be adopted.

The power supply device 200 and a power supply system SY200 that is configured by connecting a plurality of power supply devices 200 in series will be explained below. The power supply device 200 is provided with the current detection circuit 22 instead of the temperature detection circuit 17 in the power supply device 100. In this respect, the power supply device 200 is different from the power supply device 100. However, the other configurations are substantially the same between the power supply devices 100 and 200. Therefore, redundant explanations with respect to the same configurations as the power supply device 100 are omitted but the same reference numerals are used for labeling. Further, the power supply system SY200 uses the power supply devices 200 instead of the power supply devices 100 in the power supply system SY100. In this respect, the power supply system SY200 is different from the power supply system SY100. However, the configurations of connecting the power supply devices 200 in series and the configurations of an external control circuit CNT of the power supply system SY200 is the same as the power supply system SY100. Therefore, redundant explanations with respect to the same configurations as the power supply system SY100 are omitted but the same reference numerals are used for labeling.

Figure 9:
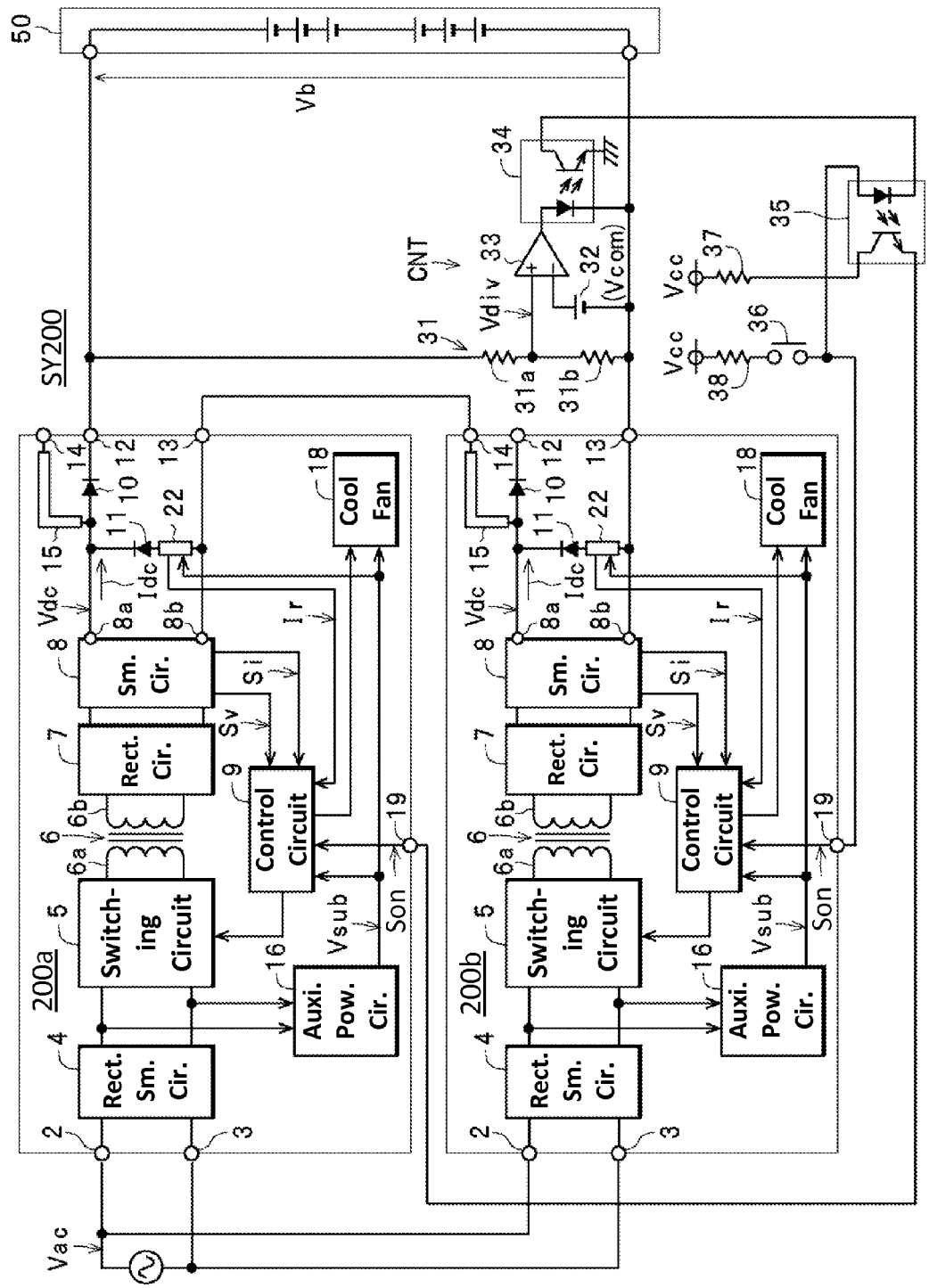
FIG. 9 is a circuit diagram that shows a configuration of a power supply device and a power supply system according to another embodiment of the present invention.

The power supply device 200 shown in FIG. 9 is configured with a positive input terminal 2, a negative input terminal 3, a rectification smoothing circuit 4, a switching circuit 5, a transformer 6, a rectifying circuit 7, a smoothing circuit 8, a control circuit 9, a reverse flow prevention rectifying device 10, a bypass rectifying device 11, a positive output terminal 12, a negative output terminal 13, a serial connection terminal 14, a bus bar 15, an auxiliary power supply circuit 16, a current detection circuit 22, a cooling fan 18 and a control input terminal 19. Further, the power supply device 200 is configured as an insulated converter that converts an external input voltage that is input between the positive input terminal 2 and the negative input terminal 3 into a DC voltage Vdc.

When an operation instruction signal Son is input to the control circuit 9 from outside, the control circuit 9 performs switching control for a switching element of the switching circuit 5. Further, the control circuit 9 performs fan control regardless of existence or non-existence of an input of the operation instruction signal Son.

In the fan control, a current Ir (a DC current Idc in the embodiment) is detected by the current detection circuit 22 and flows in the bypass rectifying device 11. As explained below, when the current Ir is equal to or less than a threshold current Ith that is defined in advance, the control circuit 9 stops the cooling fan 18. When the current Ir exceeds the threshold current Ith, the control circuit 9 operates the cooling fan 18.

The current detection circuit 22 is configured by using such as a detection resistor in which a minute resistance value is, for instance, less than 1Ω, a hall element, a magnetoresistive effect element (a MR element), a giant magnetoresistive effect element (a GMR element) or a flux gate sensor. The current detection circuit 22 operates by an auxiliary voltage Vsub supplied by the auxiliary power supply circuit 16. Thus, the current detection circuit 22 detects the current Ir that flows in the bypass rectifying device 11 and outputs the detected current Ir to the current circuit 9.

Next, an operation of the power supply device 200 will be explained with reference to an example for charging a storage battery unit 50 that corresponds to an example of a load in a state in which the power supply system SY200 is configured with a plurality of the power supply devices 200 (two power supply devices 200a and 200b in the embodiment as shown in FIG. 9) that are connected in series.

First, a configuration of the power supply system SY200 will be explained. The power supply system SY200 is configured with two power supply devices 200a, 200b and an external control circuit CNT. Specifically, the external control circuit CNT is located outside of each of the power supply devices 200a and 200b and performs an integrated control to the operation of each of the power supply devices 200a and 200b. Further, connection configurations of the power supply devices 200a and 200b are identical with the connection configurations of the power supply devices 100a and 100b explained above. The external control circuit CNT is identical with the external control circuit CNT of the power supply system SY100 explained above. Therefore, these explanations are omitted.

Next, the operation of the power supply system SY200 will be explained as well as the operation of each power supply device 200. Charging operations of each of the power supply devices 200 for the storage battery unit 50 are identical with the operation of each of the power supply devices 100 in the power supply system SY100 explained above. Therefore, only the operation with respect to the current detection circuit 22 that is different from the operation of the power supply device 100 will be explained.

In each of the power supply devices 200a and 200b of the power supply system SY200, not only when the charging operation is performed for the storage battery unit 50, but also when the charging operation is not performed (when the operation instruction signal Son is not input), each control circuit 9 performs the fan control as explained above and each current detection circuit 22 performs the current detection. In this case, when only the power supply device 200b performs the charging operation in the operating state, and even when the power supply device 200a is in a stop operation state, the bypass rectifying device 11 of the power supply device 200a generates heat because the DC current Idc continuously flows in the bypass rectifying device of the power supply device 200a. At this time, the current detection circuit 22 of the power supply device 200a detects a current Ir flowing in the bypass rectifying device 11 and outputs the detected current Ir to the control circuit 9. Therefore, when the current Ir of the bypass rectifying device 11 that is detected by the current detection circuit 22 exceeds the threshold current Ith, the control circuit 9 of the power supply device 200a operates the cooling fan 18. As a result, in the power supply device 200a, even when the charging operation is not performed (is in the stop operation state), an outbreak of a state, in which the bypass rectifying device 11 deteriorates or is damaged by the generated heat that exceeds a permissible range, can be avoided.

Thus, in the power supply device 200, as in the power supply device 100, the bypass rectifying device 11 is connected in advance between the positive output end 8a and the negative output end 8b of the smoothing circuit 8. At this time, a forward direction of the bypass rectifying device 11 faces toward the positive output end 8a. Therefore, according to the power supply device 200 as well, when the plurality of power supply devices 200 are connected in series and configure the power supply system SY200, the bypass rectifying device does not need to be separately and independently prepared for and be externally attached to each of the power supply devices. Therefore, the plurality of power supply devices 200 can be connected in series by extremely simple work.

Further, according to the power supply device 200, in a case in which the power supply system SY200 is configured by connecting the plurality of power supply devices explained above, even when the bypass rectifying device 11 generates heat in the power supply device 200 that is in the stop operation state, the control circuit 9 operates the cooling fan 18 when a current Ir exceeds the threshold current Ith. As a result, an outbreak of a state, in which the bypass rectifying device 11 deteriorates or is damaged by its generated heat that exceeds a permissible range, can certainly be avoided.

Modified Embodiments

As discussed above, the power supply devices 100 and 200 are provided (are formed) with the reverse flow prevention rectifying device 10 as well as the bypass rectifying device 11. At the same time, the power supply devices 100 and 200 adopt the configuration in which the serial connection terminal 14 and the bus bar 15 are provided. However, it is not limited to the above configurations. For example, a configuration in which only the bypass rectifying device 11 is provided without the reverse flow prevention rectifying device 10 or a configuration in which both serial connection terminal 14 and bus bar 15 are omitted can also be adopted. Even through the above modified configurations are adopted, an outbreak of a state, in which the bypass rectifying device 11 deteriorates or is damaged by its generated heat that exceeds a permissible range, can certainly be avoided. Because the bypass rectifying device 11 is still provided, and because the configurations in which the temperature detection circuit 17 is provided in the power supply device 100 explained above or the configuration in which the current detection circuit 22 is provided in the power supply device 200 are adopted, the above effects are achieved. Further, in the state in which the power supply device 100 is configured as the power supply system SY100 or in the state in which the power supply device 200 is configured as the power supply system SY200, even any power supply device 100 (or 200) is in the stop operation state, an outbreak of a state, in which the bypass rectifying device 11 deteriorates or is damaged by its generating heat that exceeds a permissible range, can certainly be avoided because the temperature detection circuit 17 or the current detection circuit 22 is provided.

Further, in the power supply devices 100 and 200 explained above, when the control circuit 9 receives the operation instruction signal Son, the control circuit 9 performs the switching control of the switching element of the switching circuit 5. In addition, when the power supply device 100 is configured as the power supply system SY100 or the power supply device 200 is configured as the power supply system SY200, the storage battery unit 50 is charged by the plurality of power supply devices 100 (200) that are connected in series and by sequentially shifting each of the power supply devices 100 (200) to the operating state by the external control circuit CNT. As a result, the entire efficiency of the power supply system SY100 and SY200 can be improved compared with a state in which the plurality of power supply devices 100 (200) in the power supply system SY100 (SY200) are shifted to an operation state at the same time and in which all power supply devices are in an operation state when a DC current voltage is low.

Therefore, in the power supply system SY100 (SY200), until all of the power supply devices 100 (200) shift to be in an operation state, the power supply device 100 (200) that stops a switching operation always exists. Thus, the bypass rectifying device 11 generates heat in the stopped power supply device 100 (200). Therefore, in the stopped power supply device 100 (200), because the auxiliary voltage Vsub from the auxiliary power supply circuit 16 is supplied to the control circuit 9, the temperature detection circuit 17 (or the current detection circuit 22) and the cooling fan 18, those circuits and elements can operate as explained above. As a result, an outbreak of a state, in which the bypass rectifying device 11 deteriorates or is damaged by its generated heat that exceeds a permissible range, can certainly be avoided.

However, in the configuration explained above in which the plurality of the power supply devices 100 (200) connecting in series starts the charging operations at the same time, i.e., in the configuration in which the control circuit 9 always performs the switching operation even when there is no input of the operation instruction signal Son, the control circuit 9, the temperature detection circuit 17 (or the current detection circuit 22) and the cooling fan 18, to which the auxiliary voltage Vsub from the auxiliary power supply circuit 16 is supplied, can also perform the operations so as to avoid the heat that is generated by the bypass rectifying device 11.

In the power supply system SY100 (SY200) that adopts the configurations of the power supply devices 100 (200) explained above, the plurality of power supply devices 100 (200) start the charging operations for the storage battery unit 50 at the same time and charge the storage battery unit 50 to substantially an added voltage value that is calculated by adding each reference voltage value of each power supply device 100 (200). Therefore, according to the power supply devices 100 (200), while it is not necessary to attach the bypass rectifying device 11 externally to each power supply device, the plurality of power supply devices 100 (200) connected in series can charge the storage battery unit 50. Further, because at least one power supply device 100 (200) among the plurality of power supply devices 100 (200) stops the operation for any reason (broken, malfunction), the DC current Idc that is output from the other non-stopped power supply devices 100 (200) flows in the bypass rectifying device 11 that is located in the stopped power supply device 100 (200) to charge the storage battery unit 50 (bypasses the stopped power supply device 100 (200)) so that such the bypass rectifying device 11 generates heat. However, because the auxiliary voltage Vsub from the auxiliary power supply circuit 16 is supplied to the control circuit 9, the temperature detection circuit 17 (or the current detection circuit 22) and the cooling fan 18, the control circuit 9 can cool the bypass rectifying device 11 that generates heat by operating the cooling fan 18. As a result, an outbreak of a state, in which the bypass rectifying device 11 deteriorates or is damaged by its generating heat that exceeds a permissible range, can certainly be avoided.

In each embodiment explained above, the cooling fan 18 cools not only the bypass rectifying device 11 but also the other parts that are located inside the power supply device. However, it is not limited to the above embodiment. For example, a cooling fan may be dedicated to cool only the bypass rectifying device 11 instead of the above cooling fan 18 or in addition to the above cooling fan 18. In other words, such a dedicated cooling fan is provided next to the bypass rectifying device 11 in a power supply device and applies a breeze to the bypass rectifying device 11. Further, the dedicated cooling fan can be operated by the auxiliary voltage Vsub controlled by the control circuit 9.

According to the above configuration, the dedicated cooling fan is required to cool only the bypass rectifying device 11. As compared with a cooling fan that is required to cool the entire inside of the power supply device, a small size (low consumption power) cooing fan can be used for the dedicated cooling fan. Therefore, the power consumption that is used at the time of cooling for the bypass rectifying device 11 can be reduced.

The power supply device and the power supply system being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A power supply device, comprising:
    a transformer that has a primary winding and a secondary winding, a first voltage being intermittently applied to the primary winding, a second voltage being induced at the secondary winding in accordance with the applied first voltage;
    a switching element that is located at a primary side of the transformer and that performs a switching operation so as to intermittently apply the first voltage to the primary winding;
    a rectification smoothing circuit that is located at a secondary side of the transformer, the rectification smoothing circuit being configured to:
        have a positive output end and a negative output end;
        rectify and smooth the second voltage so as to generate a direct current voltage between the positive output end and the negative output end; and
        output a voltage detection signal that is generated based on the direct current voltage;
    a control circuit that receives the voltage detection signal so as to control the switching operation of the switching element;
    a positive output terminal and a negative output terminal that are located at the secondary side of the transformer and that output the direct current voltage;
    a serial connection terminal to which another power supply device is connectable, the serial connection terminal being located at the secondary side of the transformer;
    a reverse flow prevention rectifying device that is located at the secondary side of the transformer;
    a bypass rectifying device that is located at the secondary side of the transformer; and
    a bus bar that is made of a metal conductor and that is attached to at least one of the reverse flow prevention rectifying device and the bypass rectifying device, wherein
    the serial connection terminal is connected to the positive output end,
    the negative output terminal is connected to the negative output end,
    the reverse flow prevention rectifying device is connected between the positive output end and the positive output terminal, and a forward direction of the reverse flow prevention rectifying device is toward the positive output terminal,
    the bypass rectifying device is connected between the positive output end and the negative output end, and a forward direction of the bypass rectifying device is toward the positive output end,
    the bus bar forms a radiator that removes heat from the one of the reverse flow prevention rectifying device and the bypass rectifying device, and
    the serial connection terminal is connected to the positive output end via the bus bar.

2. A power supply system, comprising:
    two or more of the power supply devices according to claim 1 including first and second power supply devices, wherein
    each of the first and second power supply devices has the positive and negative output terminals, the serial connection terminal and the direct current voltage,
    the first power supply device is located at a high potential side of the power supply system, and the second power supply device is located at a low potential side of the power supply system,
    the first and second power supply devices are connected in series by connecting the negative output terminal of the first power supply device with the serial connection terminal of the second power supply device, and
    a sum of the direct current voltage of the first power supply device and the direct current voltage of the second power supply device is output between the positive output terminal of the first power supply device and the negative output terminal of the second power supply device.

3. A power supply device, comprising:
    a transformer that has a primary winding and a secondary winding, a first voltage being intermittently applied to the primary winding, a second voltage being induced at the secondary winding in accordance with the applied first voltage;
    a switching element that is located at a primary side of the transformer and that performs a switching operation so as to intermittently apply the first voltage to the primary winding;
    a rectification smoothing circuit that is located at a secondary side of the transformer, the rectification smoothing circuit being configured to:
        have a positive output end and a negative output end;
        rectify and smooth the second voltage so as to generate a direct current voltage between the positive output end and the negative output end; and
        output a voltage detection signal that is generated based on the direct current voltage;
    a control circuit that receives the voltage detection signal so as to control the switching operation of the switching element;
    a positive output terminal and a negative output terminal that are located at the secondary side of the transformer and that output the direct current voltage;
    a serial connection terminal to which another power supply device is connectable, the serial connection terminal being located at the secondary side of the transformer;
    a reverse flow prevention rectifying device that is located at the secondary side of the transformer;
    a bypass rectifying device that is located at the secondary side of the transformer; and
    a bus bar that is made of a metal conductor and that is attached to at least one of the reverse flow prevention rectifying device and the bypass rectifying device, wherein
    the serial connection terminal is connected to the negative output end, the positive output terminal is connected to the positive output end, the reverse flow prevention rectifying device is connected between the negative output end and the negative output terminal, and a forward direction of the reverse flow prevention rectifying device is toward the negative output end, the bypass rectifying device is connected between the positive output end and the negative output end, and a forward direction of the bypass rectifying device is toward the positive output end, the bus bar forms a radiator that removes heat from the one of the reverse flow prevention rectifying device and the bypass rectifying device, and the serial connection terminal is connected to the negative output end via the bus bar.

4. A power supply system, comprising:

two or more of the power supply devices according to claim 3 including first and second power supply devices, wherein each of the first and second power supply devices has the positive and negative output terminals, the serial connection terminal and the direct current voltage, the first power supply device is located at a high potential side of the power supply system, and the second power supply device is located at a low potential side of the power supply system, the first and second power supply devices are connected in series by connecting the serial connection terminal of the first power supply device with the positive output terminal of the second power supply device, and a sum of the direct current voltage of the first power supply device and the direct current voltage of the second power supply device is output between the positive output terminal of the first power supply device and the negative output terminal of the second power supply device.

* * * * *